United States Patent [19]

Ito et al.

[11] Patent Number: 4,830,802

[45] Date of Patent: May 16, 1989

[54] METHOD OF MAKING MOLD USED IN PRESSURE SLIP CASTING

[75] Inventors: Haruyuki Ito; Akio Matsumoto, both of Kitakyushu, Japan

[73] Assignee: Toto Ltd., Kitakyushu, Japan

[21] Appl. No.: 81,760

[22] Filed: Aug. 5, 1987

[30] Foreign Application Priority Data

Aug. 8, 1986 [JP] Japan ................................ 61-186243

[51] Int. Cl.[4] .............................................. B29C 39/12

[52] U.S. Cl. ...................................... 264/135; 264/86; 264/225; 264/278; 264/299; 264/313; 264/250; 425/3; 425/DIG. 33; 249/141

[58] Field of Search ................... 264/86, 87, 129, 130, 264/133, 134, 135, 219, 220, 225, 226, 227, 221, 246, 247, 250, 251, 264, 271.1, 275, 278, 279, 299, 300, 304, 307, 313, 317, 36, DIG. 43, DIG. 63, DIG. 64; 249/58, 62, 113, 114, 115, 134, 135, 141, 160, 142; 425/84, 85, 86, 437, 812, DIG. 102, DIG. 33.3

[56] References Cited

U.S. PATENT DOCUMENTS

| | | | |
|---|---|---|---|
| 1,525,797 | 2/1925 | Blum | 264/278 |
| 2,964,821 | 12/1960 | Meehan | 264/278 |
| 2,979,801 | 4/1961 | Gasmire | 264/278 |
| 3,243,860 | 4/1966 | Whittaker et al. | 25/129 |
| 3,286,974 | 11/1966 | Dean | 249/142 |
| 3,723,584 | 3/1973 | Nussbaum | 264/219 |
| 4,191,722 | 3/1940 | Gould | 264/278 |
| 4,413,966 | 11/1983 | Mills et al. | 264/86 |
| 4,673,542 | 6/1987 | Wigner | 425/DIG. 33 |

FOREIGN PATENT DOCUMENTS

| | | | |
|---|---|---|---|
| 0211653 | 2/1987 | European Pat. Off. | 264/87 |
| 38-17811 | 4/1963 | Japan . | |
| 56-14451 | 4/1981 | Japan . | |
| 58-208005 | 12/1983 | Japan . | |
| 60-8010 | 1/1985 | Japan . | |
| 0179212 | 9/1985 | Japan | 264/219 |
| 1295055 | 11/1972 | United Kingdom . | |

*Primary Examiner*—James Lowe

*Assistant Examiner*—Jeremiah F. Durkin, II

*Attorney, Agent, or Firm*—Fleit, Jacobson, Cohn & Price

[57] ABSTRACT

A method of making a porous mold used in pressure casting for forming ceramic articles, which includes the steps of: removably attaching a plurality of apertured holding members in an array at a desired interval to the inner face of an upper case made of a rigid material; threading a flexible line into the apertures of the holding members in each row to hold it at a predetermined spacing from the inner face of the upper case, at least one of the two ends of the flexible line being extended to the outside of the upper case; casting slurry into a mold cavity which is defined between the upper case and a lower basic case joined to the former case to form a porous mold; removing the upper case from the porous mold after the slurry has cured, while leaving the holding members together with the flexible lines in the porous mold; and extracting the flexible lines from the porous mold to form channels in the porous mold.

5 Claims, 3 Drawing Sheets

METHOD OF MAKING MOLD USED IN PRESSURE SLIP CASTING

BACKGROUND OF THE INVENTION

1. Field of the Invention

The present invention relates to a method of making a porous mold used in a slip casting process for forming ceramic articles.

2. Description of the Prior Art

For making most ceramic articles having a large size and complicated shape, there has been adopted for a long time a non-pressurized slip casting process using a gypsum mold. In the slip casting process, however, water is absorbed from slip into the mold by its capillary action so that the casting rate cannot be improved drastically. When the gypsum mold is saturated with the water, its capillary action is so weakened that the mold has to be dried for a long time after every one or two uses.

Therefore, a pressure casting process has recently been developed to eliminate these defects and to drastically improve the productivity.

In this pressure casting process, the slip is cast under a pressure of several to 30 $Kg/cm^2$ into a space between two mold parts, i.e., a mold cavity. The porous mold is made by filling up a space between a reinforcing, pressure-resisting iron container or a case and a base with a porous mold forming slurry or powder (e.g., a mixture of an epoxy resin and sand) and by curing the slurry or powder to form a structure integral with the reinforcing iron container or box.

According to this structure, it is remarkably difficult to make the strong pressure-resisting container or reinforcing iron box identical in shape to the product or article to be cast. Due to this difficulty, the porous layer will have a locally large thickness.

The excessive thickness of the porous layer will result in an increase of the elastic compression strain due to the slip pressure during the pressure casting to make the corners of the porous layer liable to be cracked. When the cast product is to be removed from the mold, moreover, there arises another defect that the reaction of the compression strain causes the porous layer to bite the product, thus making the removal or demolding difficult. On the other hand, the pressure casting process is required to have not only drain passages for spurting the water which has been forced during the casting into the porous mold but also compressed air passages for injecting air and water into the molding surface through the porous mold when the product is to be removed from the mold. In case the mold is constructed of two upper and lower parts, for example, the upper part of the mold has to be evacuated during removal of the product from the lower mold part, so that the product may be attracted to the upper mold part and will not drop. For this purpose, the air passages are also indispensable. These passages may be commonly shared and should have their interval and spacing from the molding surface to effect even injections of water and air thereby to avoid trouble during the demolding. A variety of processes for forming such water and air passages have been proposed but encountered with difficulties in their manufacture and use.

According to one of the processes of the prior art, more specifically, a porous mold having water and air passages is made by forming a wire mesh into a cage held at a desired spacing from the molding surface, by fixing at an appropriate interval either porous tubes or tubular members made of coils covered with cloth for water and air communication, by fixing the cage to a pressure-resisting container at a desired spacing from the molding surface, by jointing the pressure-resisting container to a base case to form a molding cavity, and by casting and curing a porous layer forming slurry in the molding cavity. This process is defective in that the cage has to be formed for each mold, in that the cage of wire mesh is difficult to have an accurate shape and to arrange the water passages accurately in the porous layer, and in that it is troublesome to make the tubular members to be attached to the cage. Because it is difficult to work with water and air passages having a small diameter, a portion of the passages is enlarged at the intersections. This raises problems in the strength of the mold and in the spacing from the molding surface. This thus invites trouble with the intersecting passages.

According to another process proposed (in Japanese Patent Laid-Open No. 8010/1985), flexible or rigid lines are fixed directly in a reinforcing iron box, and this iron box is joined to a base to form a mold cavity. A porous layer forming slurry is cast and cured in the mold cavity. After the slurry has cured, the lines are extracted to form draining passages. According to this process, however, the iron box cannot be identical in shape to the product or article to be formed. As a result, there arises a defect that the water and air passages cannot be formed while having their spacing from the molding surface and their interval selected, as desired.

According to still another process proposed, grooves are formed in the rear surface of a porous mold formed in advance by means of a tool and are covered with tapes carrying an adhesive to form the water and air passages. This process is followed by defects that the dimensional accuracy of the grooves is not achieved and that because of the manual works of adhering the tapes with adhesive to the grooves, the fingers of the workers will be poisoned with the adhesive. Another defect is that the compressed air will leak from the adhered portions, when the mold is used, to break the mold.

SUMMARY OF THE INVENTION

It is, therefore, an object of the present invention to provide a method of making a mold which is freed from the above-specified defect of the prior art and which is easy to make and suitable for use.

According to a major feature of the present invention, there is provided a method of making a porous mold used in pressure casting for forming ceramic articles, which comprises the steps of: removably attaching a plurality of apertured holding members in an array at a desired interval to the inner face of an upper case made of a rigid material; threading a flexible line into the apertures of the holding members in each row to hold it at a predetermined spacing from the inner face of said upper case, at least one of the two ends of said flexible line being extended to the outside of said upper case; casting slurry into a mold cavity which is defined between said upper case and a lower basic case joined to the former case to form a porous mold; removing said upper case from the porous mold after said slurry has cured, while leaving said holding members together with said flexible lines in said porous mold; and extracting said flexible lines from said porous mold to form channels in said porous mold.

In order to removably attach the holding members to the upper case, there can be adopted the following method: the method of fixedly burying a plurality of magnets in the inner face of the upper case by making the holding members of a ferromagnetic material.

According to these methods, the holding members are separated from the upper case and left in the porous mold when the upper case is removed so that the upper case can be removed without any difficulty from the porous mold even in case the porous mold has vertical and/or inclined faces. This makes it unnecessary to fill up the apertures, which are formed as a result that the holding members are removed together with the upper case from the porous mold, with a resin, as in the case the holding members are perpetually fixed in the upper case. Thus, the working efficiency is drastically improved.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

The present invention will be described in detail in the following with reference to the accompanying drawings.

Figure 1:
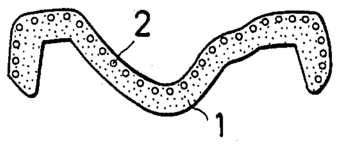
FIG. 1 is a section showing a porous mold manufactured by the method of the present invention.
Figure 2:
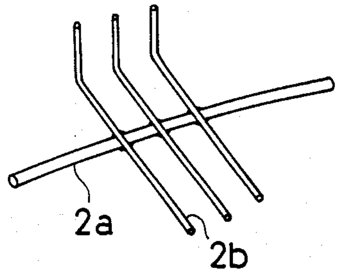
FIG. 2 is a schematic view showing channels or canals formed in the porous mold.

FIG. 1 is a section showing a porous mold which is manufactured by the method of the present invention. The porous mold 1 is formed therein with a number of passages such as channels or canals 2 for water and air communications. The channels 2 are composed of intersecting trunk and branch channels 2*a* and 2*b*, as schematically shown in FIG. 2.

Figure 3:
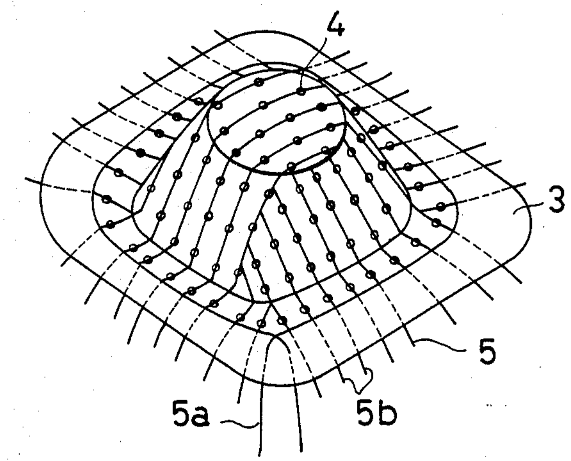
FIG. 3 is a perspective view showing an upper case to be used in the method of the present invention.

FIG. 3 shows an upper case 3 which is to be used for manufacturing a porous mold by the method of the present invention. This upper case 3 is made of a rigid material such as FRP (fiber reinforced plastic). To the upper case 3, there are attached through holding members 4 and a number of flexible lines 5 which are arranged at a predetermined interval. Reference numeral 5*b* denotes flexible lines for the branch channels, which are intersected by a flexible line 5*a* for the trunk channel. All of these flexible lines 5 have their ends extending to the outside of the upper case 3 so that they may be extracted out of the porous mold 1 after this mold 1 has cured. The flexible lines 5 may preferably be formed into a rod or tube shape having a circular or elliptical section and made of an elastic and strong material such as silicone or polyethylene rubber. The lines 5 may desirably have a diameter of 1 to 5 mm.

Figure 4:
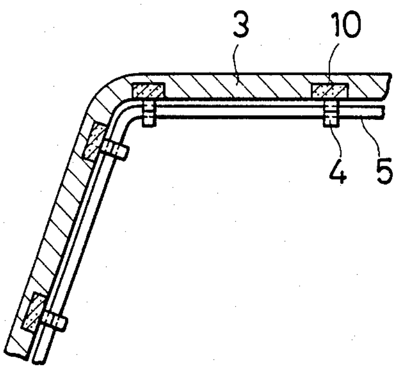
FIG. 4 is a detailed view showing the state in which flexible lines are attached to the upper case by means of holding members.
Figure 5:
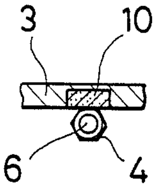
FIG. 5 is a front elevation showing the relation between the magnets of the upper case and the corresponding holding members.
Figure 6:
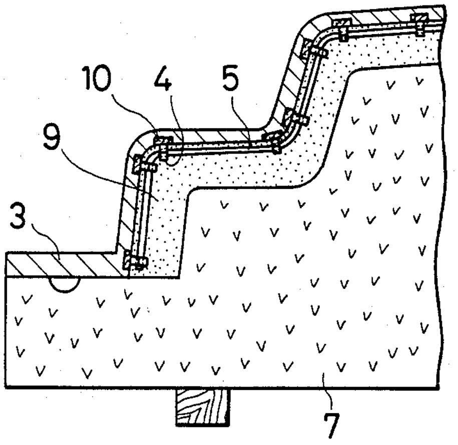
FIG. 6 is a section showing the state in which slurry for forming the porous mold is cast into a mold cavity defined by the upper case and a lower basic case joined to the former.

As seen from FIG. 3, the upper case 3 is suitable for manufacturing the porous mold which is made to have vertical and/or inclined faces together with a horizontal face. As best seen from FIGS. 4 and 5, in the upper case 3, there are fixedly buried magnets 10 which are arranged in an array at a predetermined interval for releasably attracting the holding members 4 which are made of a ferromagnetic material. Each of these holding members 4 is formed with an aperture 6, and each of the flexible lines 5 is threaded into and held by the apertures 6 of the holding members 4 in each row so that it is held at a predetermined spacing from the inner face of the upper case. Thus, as shown in FIG. 6, the upper case 3 carrying the flexible lines 5 is combined with a lower basic case 7, and porous mold forming slurry 9 is cast in the mold cavity defined by the two cases 3 and 7.

Figure 7:
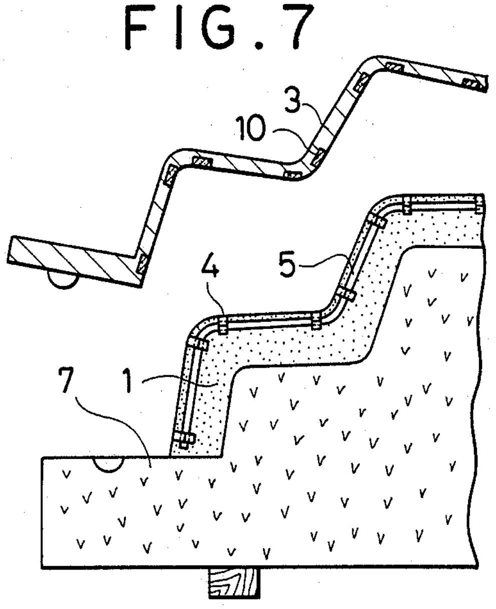
FIG. 7 is a section showing the lower basic case and the porous mold with the upper case being removed.
Figure 8:
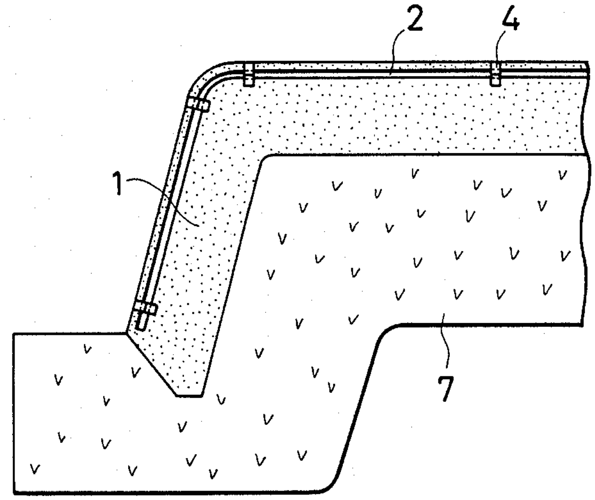
FIG. 8 is a section showing the porous mold from which flexible wire has been extracted.

After the porous mold forming slurry has cured, the upper case 3 is disengaged from the porous mold 1. Then, the magnets 10 are removed from the holding members 4 to leave the holding members 4 in the porous mold (as shown in FIG. 7). Next, the flexible lines are extracted to form the channels 2 in the porous mold 1 (as shown in FIG. 8). The holding members 4 may desirably be subjected to a treatment of rust prevention by coating it with a resin, for example, so that they may be prevented from rusting while they are being used.

In the description thus far made, the holding members are removably attached to the upper case by making the holding members of a ferromagnetic material and by providing their associative magnets. However, the removal attachment can likewise be effected by using a MAGIC TAPE fastening strip, a re-peclable adhesive or an adhesive tape.

As has been described hereinbefore, according to the method of the present invention, when a porous mold for pressure casting is to be manufactured, the upper case bearing the lines for forming the channels for water and air communications in the porous mold is used so that the spacing from the molding surface of the mold for the channels and the interval and diameter of the channels can be accurately controlled to substantially eliminate the defects concomitant with the prior art. Especially, since the channels are formed in the porous mold merely by removing the upper case and extracting the flexible lines after the porous mold has been cured, it is hardly troublesome to form the channels. Without any veteran skill, moreover, the lines can be attached remarkably promptly and simply in a predetermined array to the upper case so that the operating efficiency can be drastically improved.

What is claimed is:

1. A method of making a porous mold used in pressure casting for forming ceramic articles, comprising the steps of:

removably attaching a plurality of apertured holding members in an array at a desired interval to the inner face of an upper case made of a rigid material;

threading a flexible line into the apertures of the holding members in each row to hold said flexible line at a predetermined spacing from the inner face of said upper case, at least one of the two ends of said flexible line being extended to an outer face of said upper case;

joining said upper case to a lower basic case to form a molding cavity therebetween;

casting slurry into a mold cavity which is defined between said upper case and a lower basic case joined to the former case to form a porous mold;

removing said upper case from the porous mold after said slurry has cured, while leaving said holding members together with said flexible lines in said porous mold; and extracting said flexible lines from said porous mold and leaving said holding members in said porous mold to form channels in said porous mold.

2. A porous mold making method according to claim 1, wherein said removably attaching step includes fixedly burying a plurality of magnets in the inner face of said upper case, and wherein said holding members are made of a ferromagnetic material and wherein said holding members are attached to said magnets.

3. A porous mold making method according to claim 1, wherein said flexible lines are made of rod-like or tubular elements having a diameter of 1 to 5 mm.

4. A porous mold making method according to claim 3, wherein said rod-like or tubular members are made of silicone or polyethylene rubber.

5. A porous mold making method according to claim 1, further comprising the step of coating said holding members with a resin to prevent rust.

* * * * *